O. JOHNSON.
VEHICLE COUPLING.
APPLICATION FILED AUG. 26, 1914.
1,187,530.
Patented June 20, 1916.
2 SHEETS—SHEET 1.
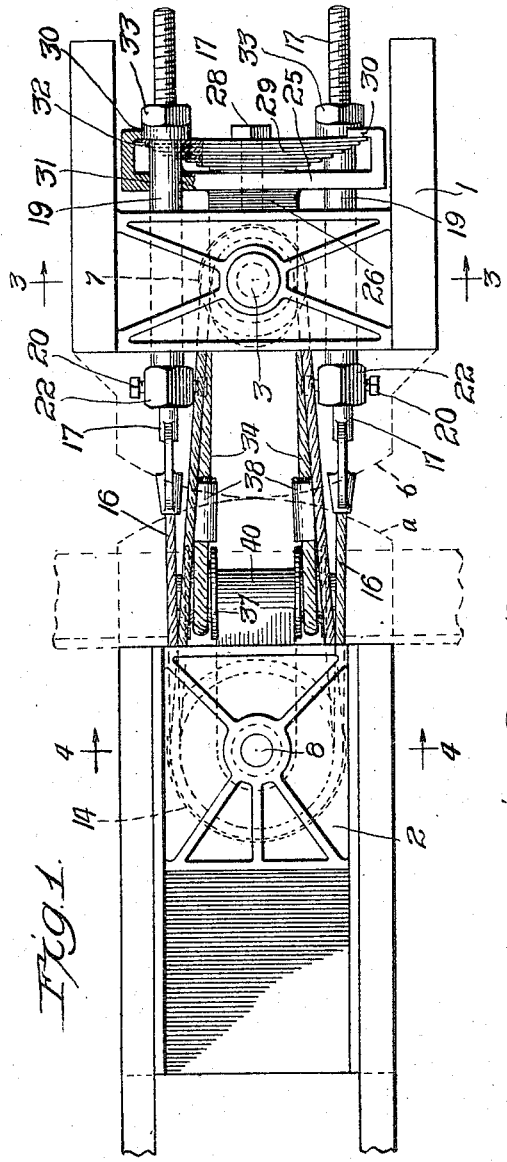
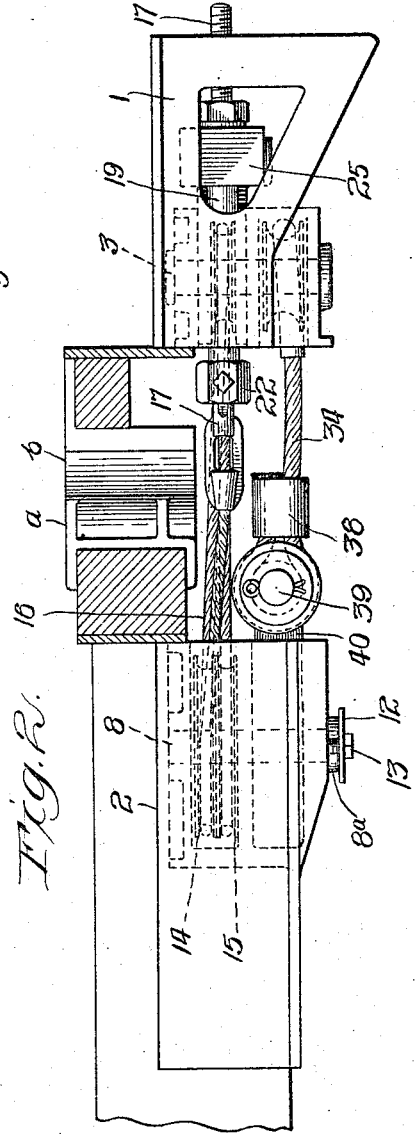

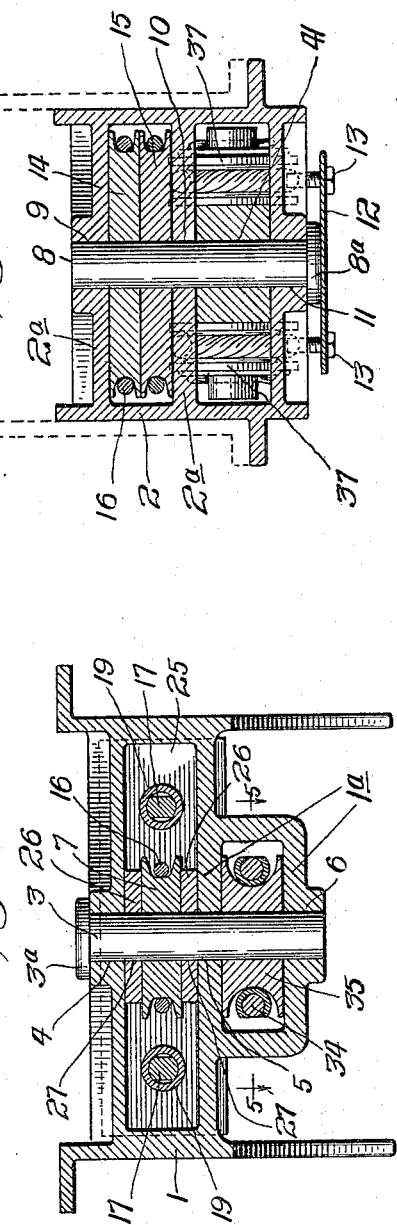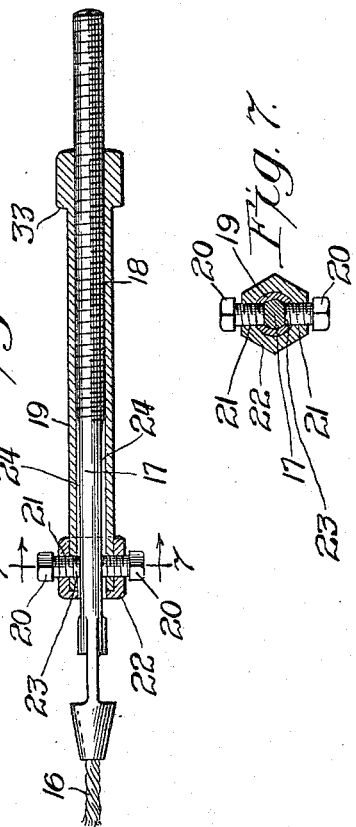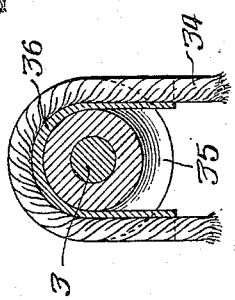

UNITED STATES PATENT OFFICE.

OSCAR JOHNSON, OF CHICAGO, ILLINOIS.

VEHICLE-COUPLING.

1,187,530.  Specification of Letters Patent.  Patented June 20, 1916.

Application filed August 26, 1914. Serial No. 858,600.

*To all whom it may concern:*

Be it known that I, OSCAR JOHNSON, a citizen of the United States, residing at Chicago, in the county of Cook and State of Illinois, have invented certain new and useful Improvements in Vehicle-Couplings, of which the following is a specification.

This invention relates particularly to means for coupling a tender to a locomotive engine. The means ordinarily employed for this purpose consists of a draw-bar having openings to receive pins carried by the engine and the tender. Owing to the swaying and rocking movements of the engine and the tender, the ends of the openings in the draw-bar become enlarged and flaring so that the bearing surface of the draw-bar upon the pins becomes greatly reduced, thereby seriously weakening the coupling.

In Patent No. 1,065,688 granted to me on June 24, 1913, is shown a locomotive coupling comprising a cable suitably arranged upon sheaves with means for taking up slack in the cable and holding the chafing plates or bumpers together at all times. The construction shown in said patent does not, however, prevent reduction of the bearing surface by wear due to the rolling and rocking movements of the engine and the tender.

The principal object of this invention is to provide means for so coupling together the engine and the tender that relative movement of the engine and the tender shall not cause reduction of the bearing surfaces.

Another object of the invention is to provide convenient means for taking up slack in the coupling.

Another object is to provide a locomotive coupling having means for cushioning the shock caused by the jerks of the engine when starting the train.

A further object of the invention is to provide improved means for insuring that the engine and the tender shall remain coupled together in case of failure of the before mentioned coupling means.

In the accompanying drawings, Figure 1 is a top plan view of one form of construction embodying the features of my invention. Fig. 2 is a side elevation. Fig. 3 is a vertical sectional view taken in the plane of dotted line 3—3 of Fig. 1. Fig. 4 is a similar view on dotted line 4—4 of Fig. 1. Fig. 5 is a view taken in the plane of dotted line 5—5 of Fig. 3. Fig. 6 is a detail view of one of the adjustable connectors. Fig. 7 is a section on line 7—7 of Fig. 6.

In the embodiment herein shown of my invention, the coupling comprises a bracket 1 adapted to be rigidly secured to the frame of a locomotive and a bracket 2 adapted to be rigidly secured to the frame of the tender. These brackets may be of any suitable construction.

3 is a pivot pin extending through vertically alined openings 4, 5 and 6 in the bracket 1, said pivot pin being provided at its upper end with a head 3ª which rests upon a suitable surface formed upon the bracket 1. Rotatably mounted upon the pivot pin 3 is a sheave or grooved pulley 7.

The bracket 2 is provided with a pivot pin 8 which extends through vertically alined openings 9, 10 and 11 in the bracket, said pin having a head 8ª upon its lower end. The pin 8 is prevented from dropping out of the openings 9, 10 and 11 by any suitable means, such as a plate 12 underlying the bracket 8ª and detachably secured to the bracket by means of screws 13. Rotatably mounted upon the pin 8 between the bearing openings 9 and 10 are two sheaves or grooved pulleys 14 and 15. Said sheaves are held against tilting or rocking on the pin in a vertical plane by suitable means, such as the webs 2ª of the bracket 2.

A cable 16 extends about the sheaves 7, 14 and 15, the ends of said cable being attached to adjustable connectors of suitable character, as, for example, that shown in Fig. 6. In the construction shown in said view, each end of the cable is rigidly secured in any ordinary or preferred manner to one end of a rod 17. Said rod is screw-threaded for engagement with the internally screw-threaded portion 18 of a sleeve 19. Relative rotation of the rod 17 and the sleeve 19 is prevented by means of set-screws 20 extending through threaded openings 21 in a cap 22, said cap fitting upon one end of the sleeve 19. The screws 20 also extend through screw-threaded openings 23 in the sleeve 19 and bear upon flattened surfaces 24 on the rod 17. The caps 22 are made polygonal for engagement by a wrench.

In order to cushion the shock due to jerks of the engine when starting the train, suitable means may be provided such as a yoke 25 having a stem 26, said stem being bifurcated to lie at opposite sides of the sheave 7. The bifurcation is provided with circular openings 27 through which the pin 3 extends. The bifurcated stem 26 prevents the sheave 7 from tilting or rocking in a vertical plane on the pin 3. Secured to the yoke 25, as by means of a screw 28, is a spring 29 of suitable character, the ends of said spring being confined by stop lugs 30 on the yoke. The sleeves 19 extend freely through openings 31 and 32 in the yoke 25 and the spring 29, respectively. The sleeves 19 are provided with polygonal heads 33 which bear against the ends of the spring 29. The strength of the spring 29 is substantially greater than the tractive force of the locomotive, so that the spring does not yield except when there is a sudden jerk, or when the distance between pin centers is increased as in rounding a curve in the track.

In operation, the traction of the engine is exerted through the cable 16. Relative movement between the engine and the tender due to the swaying or rocking of either is freely permitted by the flexible cable 16. Such relative movement cannot cause tilting of the sheaves 7, 14 and 15 in a vertical plane upon the pins 3 and 8, and hence there is no tendency to enlarge the ends of the axial openings in said sheaves, and thus reduce the area of the bearing surfaces upon the pins 3 and 8.

Slack in the cable 16 may be taken up by first unscrewing the set-screws 20 far enough to permit rotation of the sleeves 19 upon the rods 17, but not far enough to withdraw the screws 20 from the sleeves 19, a wrench being applied to the polygonal surface of the caps 22, and the sleeves 19 being turned until the cable 16 is taut and the bumpers or chafing plates $a$ and $b$ on the engine and tender are in contact with each other.

The caps 22 are readily accessible to the enginemen. The heads 33, however, cannot always be easily reached, but when accessible, they may be used to take up slack in the cable 16.

So-called safety chains are ordinarily used, in addition to the common draw-bar, to prevent separation of the engine and the tender in case of failure of the draw-bar. In place of such safety chains I provide a cable 34 extending about a grooved pulley or sheave 35 which is rotatably mounted upon the pivot pin 3. The webs 1ª of the bracket 1 prevent the sheave 35 from rocking in a vertical plane on the pin 3. Preferably a reinforcement 36 is placed upon that portion of the cable 34 which extends about the pulley 35. The ends of the cable 34 are lapped around grooved rollers 37 and secured by any suitable means such as clips 38. The rollers 37 are mounted upon a horizontal shaft 39 which is carried by a stem 40. Said stem has a circular opening 41 through which the pin 8 extends freely.

It will be seen that the construction herein disclosed provides means for coupling together the engine and tender without any slack in the coupling, although providing against injurious shock due to jerking of the engine, and allowing for the increase in the distance between pin centers caused in traversing curves.

The relative movement between the engine and the tender necessitates a coupling capable of yielding universally, that is to say, both horizontally and vertically. I prevent reduction of the extent of bearing surface on the pins 3 and 8 by permitting only horizontal yielding movement at the pins, the vertical yielding movement being taken care of in the flexible connection between the engine and tender. The flexible connection may be of any suitable character. The elements that are mounted upon the pins 3 and 8 need not be sheaves or wheels, but may be of any suitable nature. The stem 40 is an example of one form of element that may be substituted for the sheave.

I claim as my invention:

1. In a vehicle coupling, a coupling element adapted to be secured to a vehicle, another coupling element adapted to be secured to another vehicle, a sheave on the first mentioned coupling element, a sheave on the second mentioned coupling element, a yoke movably connected to one of said coupling elements in alinement with said elements, and a cable extending around said sheaves and having both of its ends adjustably connected to the yoke.

2. In a vehicle coupling, a coupling element adapted to be secured to a vehicle, another coupling element adapted to be secured to another vehicle, a sheave on the first mentioned coupling element, two sheaves on the second mentioned coupling element, and a cable extending around said sheaves and having both of its ends connected to the first mentioned coupling element.

3. In a locomotive coupling, a coupling element, a yoke having a rearwardly extending stem movably connected to said coupling element, spring means carried by said yoke at the forward side of the latter, and rearwardly extending coupling means bearing against said spring means.

4. In a vehicle coupling, a coupling element adapted to be secured to one vehicle, a coupling element adapted to be secured to another vehicle, a wheel pivotally mounted upon each of said coupling elements, a cable extending around said wheels, and means for connecting the ends of the cable to one of said coupling elements, said means comprising a screw-threaded rod connected to the cable, an internally threaded sleeve into which the threaded rod extends, a connection between said sleeve and the last mentioned coupling element permitting rotation of the sleeve, and means on the sleeve to enable rotation thereof.

5. In a vehicle coupling, a coupling element adapted to be secured to one vehicle, a coupling element adapted to be secured to another vehicle, a wheel pivotally mounted upon each of said coupling elements, a cable extending around said wheels, and means for connecting the ends of the cable to one of said coupling elements, said means comprising a screw-threaded rod connected to the cable, an internally threaded sleeve into which the threaded rod extends, a part connected to the last mentioned coupling element, said part having an opening through which the sleeve extends rotatably, a head on one end of said sleeve bearing against said part, and wrench-receiving means on the other end of said sleeve.

6. In a locomotive coupling, a bracket, an element attached to said bracket, a longitudinally extending sleeve passing rotatably through an opening in said element, a tool-receiving head on the forward end of said sleeve, a tool-receiving part on the rear end of said sleeve, a rod extending into said sleeve and having a screw-thread connection with the sleeve, and vehicle-connecting means attached to the rear end of said rod.

7. In a locomotive coupling, a bracket, a sleeve connected to the bracket, a rod extending into said sleeve and having a screw-thread connection with the sleeve, a wrench-receiving element mounted on the rear portion of the sleeve, a screw extending through the element and the sleeve and adapted to bear against the rod, and vehicle-connecting means attached to the rod.

8. In a locomotive coupler, a bracket adapted to be secured to an engine, a bracket adapted to be secured to a tender, a pivot pin carried by each of said brackets, an element mounted upon each of said pins, said element having a cylindrical opening through which the pin extends, and flexible means connecting said elements whereby a full bearing of said elements upon said pins is maintained.

9. In a locomotive coupling, a bracket adapted to be secured to the engine, a bracket adapted to be secured to the tender, cushion spring means carried by one of said brackets, and flexible means extending between said spring means and the other bracket.

10. In a locomotive coupling, two brackets adapted to be rigidly secured to the engine and the tender, one of said brackets having openings therein, a pin mounted in said openings, an element having a circular opening through which the pin extends, means to prevent movement of the element save in a plane at right angles to the axis of the pin, and a flexible connection between said element and the other bracket.

In testimony whereof, I hereunto set my hand in the presence of two witnesses.

OSCAR JOHNSON.

In the presence of—
C. PAUL PARKER,
MARGARET H. MANN.

Copies of this patent may be obtained for five cents each, by addressing the "Commissioner of Patents, Washington, D. C."